(12) United States Patent
Ameye et al.

(10) Patent No.: US 8,445,619 B2
(45) Date of Patent: May 21, 2013

(54) POLYOLEFIN POWDER

(75) Inventors: Thomas F. Ameye, Grimbergen (BE); Andre Frederich, Brussels (BE); Dominique Jan, Beaufays (BE)

(73) Assignee: Ineos Manufacturing Belgium NV, Antwerpen (BE)

( * ) Notice: Subject to any disclaimer, the term of this patent is extended or adjusted under 35 U.S.C. 154(b) by 0 days.

(21) Appl. No.: 13/317,855

(22) Filed: Oct. 31, 2011

(65) Prior Publication Data

US 2012/0104643 A1    May 3, 2012

Related U.S. Application Data

(62) Division of application No. 12/227,705, filed as application No. PCT/EP2007/004429 on May 18, 2007, now Pat. No. 8,124,708.

(30) Foreign Application Priority Data

May 26, 2006   (EP) ..................................... 06252749

(51) Int. Cl.
*C08F 4/52* (2006.01)
*C08F 4/64* (2006.01)
*B29C 55/00* (2006.01)
*B29C 57/00* (2006.01)

(52) U.S. Cl.
USPC ........... 526/348; 526/352; 526/160; 526/170; 264/563; 264/555

(58) Field of Classification Search ................... 526/348, 526/352
See application file for complete search history.

(56) References Cited

U.S. PATENT DOCUMENTS

| | | | |
|---|---|---|---|
| 4,873,300 A | 10/1989 | Fuentes, Jr. et al. | |
| 5,266,666 A * | 11/1993 | Kamiishi et al. | 526/125.3 |
| 5,648,309 A * | 7/1997 | Bohm | 502/105 |
| 6,716,924 B2 * | 4/2004 | Tsutsui et al. | 525/193 |
| 2008/0146762 A1 | 6/2008 | Mier et al. | 526/351 |

FOREIGN PATENT DOCUMENTS

| | | |
|---|---|---|
| EP | 0 479 588 A1 | 4/1992 |
| JP | 10-195264 A | 7/1998 |
| JP | 11-147908 A * | 6/1999 |
| WO | WO 91/18934 A1 | 12/1991 |
| WO | WO 2006/018245 A1 * | 2/2006 |

OTHER PUBLICATIONS

Kataoka, Takuo, JP 11-147908 A (Jun. 1999), abstract and translation in English.*
(D5) "Standard Test Methods for Particle Size (Sieve Analysis) of Plastic Materials"; Designation: D 1921-06; ASTM International (Apr. 1, 2006).
Opposition Response, Letter to European Patent Office dated Mar. 21, 2011, European Patent 2021385B (07725339.1-2109), Ineos Manufacturing Belgium NV, Opposition by Basell Polyolefine GmbH (7 pgs).
Notice of Opposition Letter of Basell Polyolefine GmbH, dated Aug. 9, 2010, EP 2 021 385 B1—Application No. 07725339.1 (11 pgs).
PCT International Preliminary Examination Report; International Application No. PCT/EP2007/004429; International Filing Date May 18, 2007 (7 pgs).

* cited by examiner

*Primary Examiner* — Rip A. Lee
(74) *Attorney, Agent, or Firm* — Nixon & Vanderhye

(57) ABSTRACT

Process for making a film or pipe by compounding an uncompounded polyolefin powder having a particle size distribution such that D95 is less than 355 μm and (D90−D10)/D50 is less than 1.2, where D95, D90, D50 and D10 are defined such that 95 wt %, 90 wt %, 50 wt % or 10 wt1 % of the polymer particles have a diameter of less than D95, D90, D50 and D10 respectively, to form pellets; and then forming the pellets into a film or pipe.

50 Claims, 1 Drawing Sheet

POLYOLEFIN POWDER

CROSS-REFERENCES TO RELATED APPLICATIONS

This application is a divisional of application Ser. No. 12/227,705 filed Jul. 21, 2009, U.S. Pat. No. 8,124,708, which is a 371 of PCT/EP2007/004429 filed May 18, 2007, which claims priority to EP 06252749.4 filed May 26, 2006, the entire contents of each of which are hereby incorporated by reference.

POLYOLEFIN POWDER

The present invention relates to polyolefin compositions and processes for polymerising olefins, and more specifically to a process for reducing the proportion of fine particles present in the polyolefins produced in the process.

BACKGROUND OF THE INVENTION

In catalytic processes for polymerizing olefinic monomers, it is well known that the properties of the polymer powder which exits the reactor are very important. Polymer powders having a high fines content can cause problems such as accumulation of fines in the recycling units, and during the transfer and packing of the powder and sampling; also risk of accumulation of static electricity in the conveyors and the storage tanks.

It is well known to overcome some of these problems by using a catalyst with an appropriate granulometry. For example, WO 05/082962 discloses a process for polymerising olefin in the presence of a Ziegler-Natta catalyst system which is characterised in that the Ziegler-Natta catalyst has a particular particle size distribution. However, the polyethylene powders produced according to this invention still have relatively large particle sizes: 50% have a diameter (D50) of at least 400 µm.

WO 05/032714 is concerned with new catalyst systems, which are said to give a low level of fines in the resultant polymer. However the number of large particles in the polymers produced with these catalysts is relatively large, with D50 values in the Examples all greater than 230 µm, and most substantially greater.

WO 05/021610 of the present applicants is also partly concerned with reducing fines in the polymer, which it achieves by using a pretreatment step in the preparation of the catalyst system. Although low levels of fines are indeed achieved, we have found that the average diameter of the polymer particles produced (not disclosed in this document) was above 230 µm.

However we have found that high proportions of large polymer particles can also lead to problems, particularly with the final product (such as a pipe or film), which may contain excessive quantities of gels or white spots. In addition to being disfiguring in black and coloured compounds, the white spots may adversely influence the strength of the composition. Gel particles with a size of about 0.01-1 mm can appear as disfiguring heterogeneities in the finished film or extruded pipe. Furthermore, gels and white spots are good proxies for the degree of homogeneity in the final product: even if the gels and white spots are not themselves a problem, the associated inhomogeneity of the product may be associated with poorer physical properties. This is particularly the case in pipes for example.

Co-pending application EP 1719788A discloses bimodal polyethylene compositions having a relatively narrow particle size distribution. However the proportion of large particles in the polymer powder (as measured by D95) is higher than in the present invention, and the ratio (D90–D10)/D50 is also higher than in the present invention, where D10, D50, D90 and D95 are as defined below.

SUMMARY OF THE INVENTION

We have now found that the incidence of gels and white spots can be reduced if not only the width of the particle size distribution but particularly the proportion of large particles in a polyolefin are reduced, despite the content of fines remaining low.

Accordingly, in a first aspect the present invention provides an uncompounded polyolefin powder having a particle size distribution such that D95 is less than 355 µm and (D90–D10)/D50 is less than 1.2, where D95, D90, D50 and D10 are defined such that 95 wt %, 90 wt %, 50 wt % or 10 wt % of the polymer particles have a diameter of less than D95, D90, D50 and D10 respectively.

A further aspect of the invention provides a process for polymerising olefins in a polymerisation reactor, characterised in that the polymer powder recovered from the reactor has a particle size distribution such that D95 is less than 355 µm and (D90–D10)/D50 is less than 1.2.

The relationship (D90–D10)/D50 is usually referred to as the span, and the D values are measured by sieving granulometry. They are expressed in µm, and may alternatively be defined as follows:

D5: value under which 5% by weight of the particles are collected;

D10: value under which 10% by weight of the particles are collected;

D50: value under which 50% by weight of the particles are collected;

D90: value under which 90% by weight of the particles are collected.

D95: value under which 95% by weight of the particles are collected.

Typically the polyolefin is polyethylene or polypropylene, such as that intended for use in pipes and films. Both aspects of the present invention are especially advantageous when the polymer is a multimodal polyethylene, especially one produced in at least two reactors. By "multimodal" in this context is meant a polymer comprising at least two blocks of different molecular weights and/or compositions (ie comonomer content).

In the case of multimodal polyethylenes produced in at least two reactors, it is often found that the largest particles exiting the final polymerisation reactor consist mainly of polymer made in the reactor producing the highest molecular weight fraction (eg this is usually the second block in a bimodal reaction). A problem with particularly large particles is that they may require longer to be fully compounded in an extruder than the residence time of the extruder; thus they exit the extruder as inhomogeneities in the compounded product, which can lead to gels or white spots. The present invention is based on an appreciation of the existence of this problem, and the fact that it can be reduced by taking steps to minimise the proportion of such very large particles.

The invention also has the advantage that despite the reduction in the proportion of very large particles, the fines content—which can be defined as the fraction of particles smaller than 50 µm (alternatively represented by D5)—is not increased, but remains generally unchanged. Hence D5 is preferably at least 50 µm, more preferably at least 60 µm.

A consequent advantage of the present invention is that reducing the number of very large particles in the polymer can permit a reduction in the degree of homogenisation required in the compounding step to reach a specified levels of gels and white spots. The invention is capable of producing a polymer powder that can be pelletised and if blown into a 200 μm thickness blown film, has a gel count, expressed as the number of gels (larger than 200 μm) per square meter of film, of less than 500, preferably less than 200, and more preferably less than 100. The gel count is measured by image analysis using a film quality testing system FS-3, available from OCS® GmbH, Film. This low gel count can be achieved after pelletisation with a specific energy of no more than 0.40 kWh/kg, in preferred cases no more than 0.30 kWh/kg, and in particularly preferred cases no more than 0.25 kWh/kg. The residence time in the pelletisation extruder may be no more than 45 seconds, particularly no more than 30 seconds and in some cases less than 20 seconds. By "specific energy" is meant the total specific energy applied to the composition, which is the difference between the sum of all the specific energies applied to the composition at any point in the extruder and any specific cooling energy. Films and pipes can thus be made from such pellets which have good homogeneity despite the relatively low specific energy employed during pelletisation.

We have also found that polymer powder bulk densities of greater than 350 kg/m$^3$, typically 380-450 kg/m$^3$ can be achieved even when the span (D90–D10)/D50 of the polymer is less than 1.2. It has been found that bulk densities are particularly enhanced in polymer produced with a catalyst having a productivity of greater than 4 kgPE/g catalyst, particularly greater than 8 kgPE/g catalyst, and especially greater than 10 kgPE/g catalyst.

It is preferred that the D95 of the polyolefin powder is less than 300 μm, more preferably less than 250 μm, and most preferably less than 210 μm. The span (D90–D10)/D50 of the polymer is preferably less than 1.0, and more preferably less than 0.9.

The uncompounded polymer powder of the invention may be a multimodal polymer, particularly a bimodal polymer. In such a case, it is preferably made by a process which comprises the steps of introducing ethylene, a polymerisation catalyst and optionally an alpha-olefin containing from 3 to 12 carbon atoms into a first reactor, polymerising the ethylene in said first reactor to form a first polymer, then transferring a mixture comprising said polymer and the catalyst where further polymerisation takes place, optionally in the presence of a further alpha-olefin containing from 3 to 12 carbon atoms, to form a second ethylene polymer, wherein the weight ratio of the two polymers is (30 to 70):(70 to 30). In one embodiment the first polymer is a low molecular weight polymer and the second polymer is a high molecular weight polymer (as determined by GPC). In an alternative embodiment, the first polymer is a high molecular weight polymer and the second polymer is a low molecular weight polymer.

In one embodiment of the invention, the polymer is a multimodal ethylene polymer having a density greater than 940 kg/m$^3$ and a melt flow index MI$_5$ of 0.05 to 50 g/10 min, said ethylene polymer comprising:

from 30 to 70 wt %, based on the total weight of the ethylene polymer, of a first polyethylene fraction having a density of at least 950 kg/m$^3$ and a melt flow index MI$_2$ of at least 10 g/10 min, and from 70 to 30 wt %, based on the total weight of the multimodal ethylene polymer, of a second polyethylene fraction comprising units of ethylene and optionally up to 5 mol % of at least one other alpha-olefin containing from 3 to 12 carbon atoms, and a melt flow index MI$_2$ of less than 10 g/10 min.

An alternative polymer is a multimodal ethylene polymer having a density between 900 and 930 kg/m$^3$ and a melt flow index MI$_2$ of 0.1 to 20 g/10 min, said ethylene polymer comprising:

from 30 to 70 wt %, based on the total weight of the ethylene polymer, of a first polyethylene fraction having a density of less than 950 kg/m$^3$ and a melt flow index MI$_2$ of at least 10 g/10 min, and from 70 to 30 wt %, based on the total weight of the multimodal ethylene polymer, of a second polyethylene fraction comprising units of ethylene, from 0.1 to 20 mol % of an alpha-olefin containing from 3 to 12 carbon atoms, and a melt flow index MI$_2$ of less than 10 g/10 min.

BRIEF DESCRIPTION OF THE DRAWINGS

The invention will now be described in more detail with reference to the accompanying drawings, in which.

DETAILED DESCRIPTION OF PREFERRED EMBODIMENTS

Figure 1:
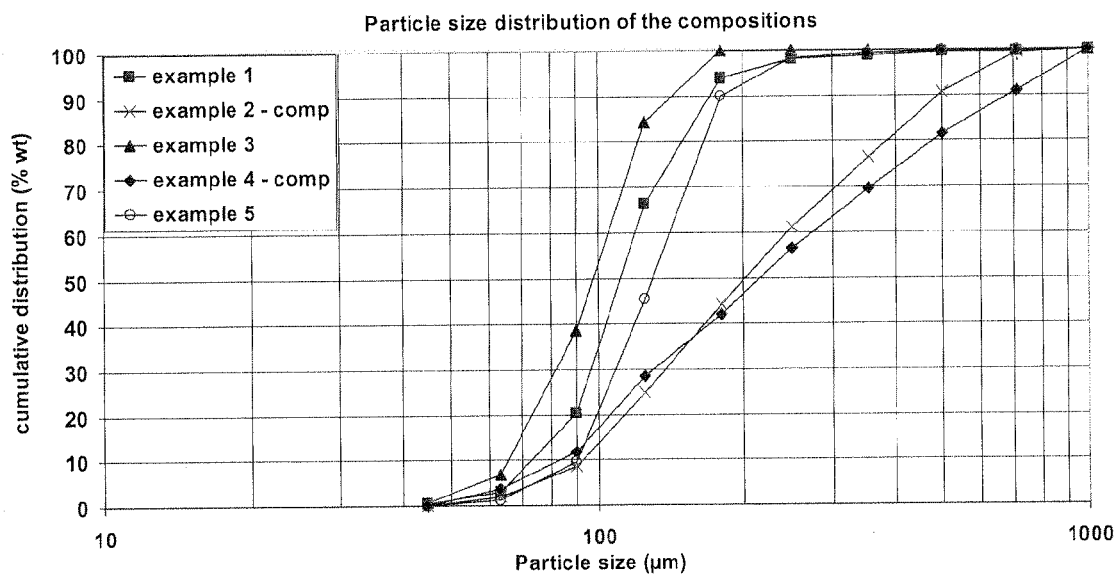
FIG. 1 shows plots of particle size distribution against cumulative distribution (% wt)

The invention also includes in another aspect pipes and films made from the polyolefin powder defined above.

Regarding the process of the invention, the particle size distribution of the invention can be achieved in a number of ways. One method is to grind the polymer after it exits the polymerisation reactor (or final polymerisation reactor in the case of multi-reactor polymerisations). Mechanical grinding of the powder can be performed in a pulverising system using disc mills, pin mills, turbo mills, knife mills or hammer mills. Alternatively, jet mills or air swept pulverisers may be used. The grinding machine may be equipped with different screening systems so as to achieve the desired powder properties. The grinding can be performed in a continuous process or batchwise. The temperature during the grinding operations is usually ambient temperature or higher, but a cryogenic grinding is also suitable.

An alternative is to select a specific catalyst which has been found to give the desired particle size distribution. The advantage of catalyst systems which provide the desired particle size distribution is that they can be used at high productivity: generally the higher the productivity (as measured in g polymer per g of catalyst) the larger the individual polymer particles formed. Thus the present invention permits the use of catalyst systems having productivity of at least 5000 g polyolefin/g of catalyst, and typically at least 10000 g polyolefin/g of catalyst.

A preferred catalytic system for use in the process of the present invention comprises:

(a) a catalytic solid comprising magnesium, at least one transition metal selected from the group consisting of titanium and zirconium and halogen, prepared by successively:

reacting, in a first step (1), at least one magnesium compound (M) chosen from oxygen-containing organic magnesium compounds with at least one compound (T) selected from the group consisting of oxygen-containing organic tetravalent titanium and zirconium compounds, until a liquid complex is obtained;

treating, in a second step (2), the complex obtained in step (1) with a halogen-containing aluminic compound of formula $AlR_nX_{3-n}$, in which R is a hydrocarbon radical comprising up to 20 carbon atoms, X is a halogen and n is less than 3, and (b) an organometallic compound of a metal chosen from lithium, magnesium, zinc, aluminium or tin.

The preparation of the solid catalytic complex comprises the step (2), the main function of which is to reduce the valency of the transition metal and simultaneously additionally halogenate, if necessary, the magnesium compound and/or the transition metal compound: thus most of the alkoxy groups still present in the magnesium compound and/or in the transition metal compound are substituted by halogens, such that the liquid complex obtained after step (1) is transformed in a catalytically active solid. The reduction and possible further halogenation are performed simultaneously using the halogen-containing aluminic compound which thus acts as a reductive halogenating agent.

The treatment using the halogen-containing aluminic compound in step (2) of the preparation of the catalytic solid may be carried out by any suitable known means, and preferably by gradually adding the halogen-containing organoaluminium compound to the liquid complex obtained in step (1).

The treatment using the halogen-containing aluminic compound in step (2) may be carried out either in one step or in two successive steps as disclosed in EP-A-0703248. The temperature at which step (2) is performed should not exceed 40° C., temperatures of no more than 35° C. being the most advantageous. The preferred temperature range is 25-40° C., with the most preferable range being 30-35° C.

The process of the invention is usually a suspension polymerisation process, typically using as diluent a C3-C8 hydrocarbon, and most commonly a C3-C6 hydrocarbon such as butane or hexane. The process may be performed in one or more reactors, and may utilise a single site catalyst, dual site catalyst or multisite catalyst.

EXAMPLES

The Examples which follow are intended to illustrate the invention. The meaning of the symbols used in these examples, the units expressing the mentioned properties and the methods of measuring these properties are explained hereinbelow.

Span: this is a measure of the particle size distribution, defined by the relationship (D90–D10)/D50 wherein the meanings of the respective D, measured by laser granulometry and expressed in µm are:

D10: value under which 10% by weight of the particles are collected;

D50: value under which 50% by weight of the particles are collected;

D90: value under which 90% by weight of the particles are collected.

The density of the polyethylene was measured according to ISO 1183-1. $MI_2$ and $MI_5$ were measured using the procedures of ISO 1133 at 190° C. using loads of 2 kg and 5 kg respectively.

The sieving operations were performed with a set of 12 calibrated sieves (45, 63, 90, 125, 180, 250, 355, 500, 710, 1000, 1400 and 2000 µm) according to ASTM D-1921 particle (sieve analysis) of Plastic Materials, Method A.

The bulk densities of the polymers were measured according to the principle set forth in ASTM standard D-1895, method A (1979) and ISO 60 (1977) by using the following procedure: the polymer powder is poured into a cylindrical container with a capacity of 50 ml, taking care not to pack it down, from a hopper whose lower edge is arranged 20 mm above the upper edge of the container. The container filled with powder is then weighed, the tare is deducted from the read weight and the result obtained (expressed in g) is divided by 50 in order to obtain the polymer bulk density expressed in kg/liter.

The gels were quantified by image analysis (Film quality testing system FS-3, available from OCS® GmbH, Film) performed on 200 microns thickness blown film. The gels count is expressed as the number of gels (larger than 200 µm) per square meter of film.

The white spots quotation was determined by microscopy in accordance with ISO 18553. Image analyses were performed with the assistance of NOESIS-Visilog® software.

Example 1

According to the Invention

A. Catalyst Preparation

In a 50 L stainless steel agitated autoclave, 6.7 moles of magnesium diethoxide were reacted with 114 moles of titanium tetrabutoxide for 4 hours at 150° C. The reaction product thus obtained was subsequently diluted by 10 L of hexane, and 37.2 moles of ethylaluminium dichloride (EADC) were added at 30° C. The addition was performed in 4 hours. Subsequently, the slurry reaction mixture was heated up to 60° C., then kept at this temperature for 45 min. The resulting brown solid was decanted and washed with several fractions of hexane so as to remove at least 75% of the reaction by-products present in the supernatant solution. The solid thus collected from the suspension comprised (% by weight): Ti: 17; Cl: 36; Al: 2; Mg: 4.

B. Polymerisation

The manufacture of a composition according to the invention was carried out in suspension in hexane in two loop reactors of volume 200 L and 300 L respectively, connected in series and separated by a device making it possible to continuously carry out a reduction in pressure.

Hexane, ethylene, hydrogen, triethylaluminium (30-50 ppm) and the above catalyst were continuously introduced into the first loop reactor and the polymerization of ethylene was carried out in this mixture in order to form the homopolymer (A). The said mixture, additionally comprising the homopolymer (A), was continuously withdrawn from the said first reactor and was subjected to a reduction in pressure (~60° C., 0.06 MPa), so as to remove at least a portion of the hydrogen. The resulting mixture, at least partially degassed of hydrogen, was then continuously introduced into a second polymerization reactor, at the same time as ethylene, butene, hexane and hydrogen, and the copolymerization of ethylene and butene was carried out therein in order to form the ethylene/1-butene copolymer (B). The suspension comprising the ethylene polymer composition was continuously withdrawn from the second reactor and this suspension was subjected to a final reduction in pressure and to steam stripping, so as to evaporate the reactants and the solvent. The composition was recovered in the form of a powder, which was subjected to further drying in a fluid bed dryer.

The detailed polymerisation conditions are specified in Table 1. The particle size distribution is determined by sieving technique, and the powder morphology is characterized by a median diameter D50 of 115 µm (Table 2 and Chart 1).

C. Compounding

To 100 parts of the polyethylene composition, 0.3 parts of antioxidant Irganox® B225, 0.1 parts of calcium stearate and 2.25 parts of carbon black were added. The resulting composition was extruded on a twin-screw extruder (commercial Werner® ZSK 40 extruder, comprising a twin-screw of 40 mm diameter, 1040 mm length) and a strand pelletiser, in the conditions specified in Table 3. The pellets of the resulting compounds were recovered and examined.

Example 2

Comparative

A. Catalyst Preparation

In a 50 L stainless steel agitated autoclave, 6.7 moles of magnesium diethoxide were reacted with 13.4 moles of titanium tetrabutoxide for 4 hours at 150° C. The reaction product thus obtained was subsequently diluted by 19 L of hexane, and 37.2 moles of ethylaluminium dichloride (EADC) were added at 45° C. The addition was performed in 2 hours. Subsequently, the slurry reaction mixture was heated up to 60° C., then kept at this temperature for 45 min. The resulting brown solid was decanted and washed with several fractions of hexane so as to remove at least 75% of the reaction by-products present in the supernatant solution. The solid thus collected from the suspension comprised (% by weight): Ti: 17; Cl: 38; Al: 2; Mg: 4.

B. Polymerisation

The composition was prepared in the same procedure as described in example 1.B, but with using catalyst of example 2.A. The detailed of the polymerisation conditions are given in Table 1. The particle size distribution was determined by sieving technique, and the powder morphology was characterized by a median diameter D50 of 202 μm (Table 2 and Chart 1).

C. Compounding

Compounding was carried out as in Example 1, but under different compounding conditions. These conditions are described in Table 1 The pellets of the resulting compounds were collected and examined.

Example 3

According to the Invention

The manufacture of a composition according to the invention was carried out in suspension in isobutane in two loop reactors of volume 200 L and 300 L respectively, connected in series and separated by a device making it possible to continuously carry out a reduction in pressure.

Isobutane, ethylene, hydrogen, triethylaluminium (30-50 ppm) and the catalyst prepared in Example 2-A were continuously introduced into the first loop reactor and the polymerisation of ethylene was carried out in this mixture in order to form the homopolymer (A). The mixture, additionally comprising the homopolymer (A), was continuously withdrawn from the said first reactor and was subjected to a reduction in pressure (~50° C., 0.6 MPa), so as to remove at least a portion of the hydrogen. The resulting mixture, at least partially degassed of hydrogen, was then continuously introduced into a second polymerisation reactor, at the same time as ethylene, hexene, isobutane and hydrogen, and the copolymerisation of ethylene and hexene was carried out therein in order to form the ethylene/1-hexene copolymer (B). The suspension comprising the composition comprising ethylene polymers was continuously withdrawn from the second reactor and this suspension was subjected to a final reduction in pressure, so as to flash the isobutane and the reactants present (ethylene, hexene and hydrogen) and to recover the composition in the form of a dry powder, which was subsequently degassed to pursue the removal of residual hydrocarbons. The other polymerisation conditions are specified in Table 1.

200 g of the resulting powder were introduced continuously in a grinder Retsch ZM1 provided with a sieving grid calibrated at 0.20 mm. The stirring speed of the mixer was set to 10000 rpm. The internal part of the mixer was checked after the grinding operation to ensure that the entire sample went through the calibrated grid. The powder particle size distribution after grinding was analysed by sieving technique and the results are summarised in Table 2 and FIG. 1.

The resulting ground powder was mixed with 2.25 wt of carbon black and Irganox® B215 antioxydant, and then extruded under different conditions on a lab-scale DSM Research 15 mL Micro-Compounder. The extrudate of the resulting compounds was recovered and examined by microscopy.

Example 4

Comparative

The powder obtained before grinding in Example 3 was mixed with 2.25% wt of carbon black and Irganox® B215 antioxidant, and then extruded under different conditions on a lab-scale DSM Research 15 mL Micro-Compounder. The pelletised extrudate was recovered and examined by microscopy.

Example 5

According to the Invention

The manufacture of a composition according to the invention was carried out in suspension in isobutane in two loop reactors of volume 200 L and 300 L respectively, connected in series and separated by a device making it possible to continuously carry out a reduction in pressure.

Isobutane, ethylene, hydrogen, triethylaluminium (30-50 ppm) and the catalyst prepared in Example 1-A were continuously introduced into the first loop reactor and the polymerisation of ethylene was carried out in this mixture in order to form the homopolymer (A). The mixture, additionally comprising the homopolymer (A), was continuously withdrawn from the said first reactor and was subjected to a reduction in pressure (~50° C., 0.6 MPa), so as to remove at least a portion of the hydrogen. The resulting mixture, at least partially degassed of hydrogen, was then continuously introduced into a second polymerisation reactor, at the same time as ethylene, hexene, isobutane and hydrogen, and the copolymerisation of ethylene and hexene was carried out therein in order to form the ethylene/1-hexene copolymer (B). The suspension comprising the composition comprising ethylene polymers was continuously withdrawn from the second reactor and this suspension was subjected to a final reduction in pressure, so as to flash the isobutane and the reactants present (ethylene, hexene and hydrogen) and to recover the composition in the form of a dry powder, which was subsequently degassed to pursue the removal of residual hydrocarbons. The other polymerisation conditions are specified in Table 1.

As for Examples 1 and 2, different compounding conditions were applied. These conditions are described in Table 3. The pellets of the resulting compounds were collected and examined.

Table 2 shows the D95 and span (D90–D10)/D50 values for the resins made in Examples 1-5. It can be seen that the Examples of the invention have a much lower values than the comparative Examples. This is also shown graphically in FIG. 1, which shows the full particle size distributions of the four resins. Examples 1, 3 and 5 show that the particle size distribution of the invention can be obtained in more than one way.

Figure 2:
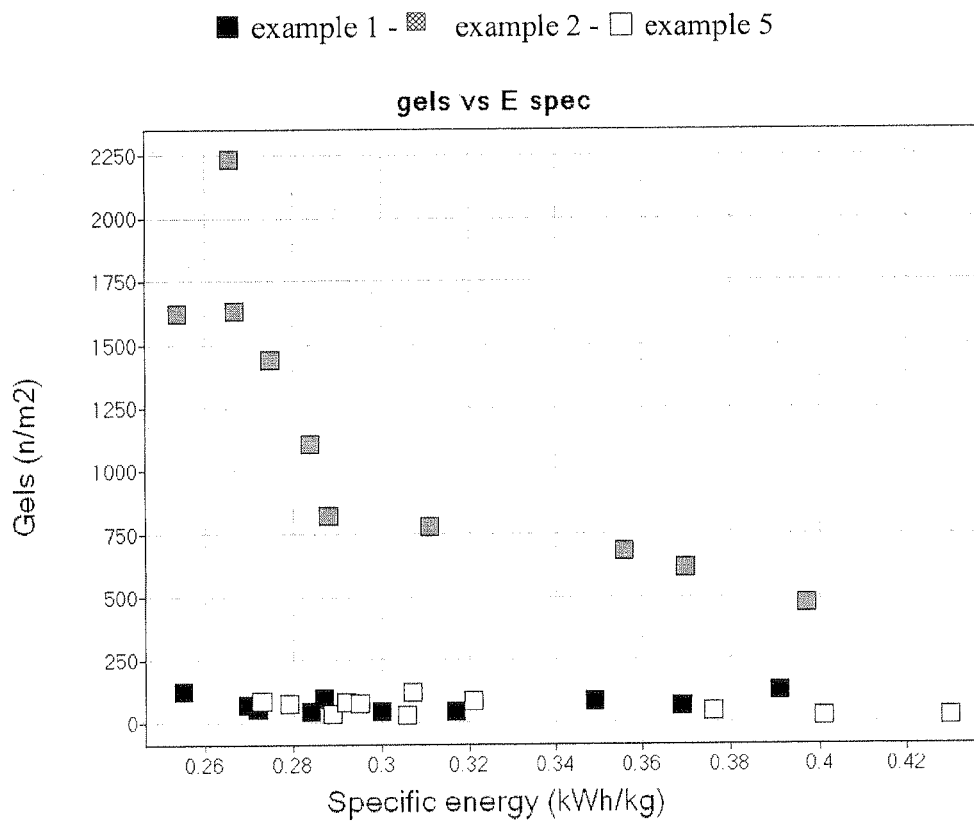
FIG. 2 shows gels vs E spec against gels (n/m2) for Examples 1, 2 and 5.

Tables 3 and 4 show how the above particle size distributions affect the appearance of gels and white spots in the compounded resins. Table 3 compares Example 1 and 5 with comparative Example 2: it can be seen that the levels of gels and white spots are lower in Example 1 and 5. FIG. 2 plots the gel count against the specific energy of extrusion for Examples 1, 2 and 5. This shows that the gel count for Examples 1 and 5 is low regardless of the specific energy: however, for comparative Example 2 the gel count is always significantly higher—at least double that of Example 1 and 5, and especially so at low specific energies.

Table 4 shows that the white spots quotation for comparative Example 4 is higher than that for Example 3 under equivalent compounding conditions.

TABLE 1

| | EXAMPLE | | | |
|---|---|---|---|---|
| | 1 | 2 | 3 | 5 |
| Diluent | Hexane | Hexane | Isobutane | Isobutane |
| Reactor 1 | | | | |
| $C_2$ (g/kg) | 12.9 | 12 | 18.1 | 15.2 |
| $H_2/C_2$ (mole/mole) | 0.38 | 0.37 | 0.50 | 0.507 |
| T (° C.) | 85 | 85 | 90 | 90 |
| Residence time (h) | 1.79 | 1.79 | 1.52 | 1.62 |
| Polymer A fraction (% wt) | 50.5 | 50.4 | 49.1 | 50.1 |
| Reactor 2 | | | | |
| $C_2$ (g/kg) | 13.2 | 9.8 | 19.4 | 29 |
| Comonomer nature | Butene | Butene | Hexene | Hexene |
| Comonomer/$C_2$ (mole/mole) | 0.587 | 0.547 | 2.039 | 2.532 |
| $H_2/C_2$ (mole/mole) | 0.0043 | 0.0036 | 0.0050 | 0.0029 |
| T (° C.) | 75 | 75 | 75 | 80 |
| Residence time (h) | 1.64 | 1.64 | 1.43 | 1.44 |
| Polymer $MI_5$ (g/10 min) | 0.31 | 0.29 | 0.30 | 0.32 |
| Polymer density (kg/m³) | 949.4 | 947.7 | 948.8 | 948.5 |
| Productivity (kg PE/g catalyst) | 13.9 | 15.5 | 15.8 | 23.0 |

TABLE 2

| | EXAMPLE | | | | |
|---|---|---|---|---|---|
| | 1 | 2 (comparative) | 3 | 4 (comparative) | 5 |
| D5, µm | 66 | 75 | 57 | 68 | 75 |
| D10, µm | 75 | 90 | 67 | 82 | 91 |
| D50, µm | 115 | 202 | 95 | 220 | 130 |
| D90, µm | 170 | 495 | 145 | 690 | 180 |
| D95, µm | 200 | 608 | 162 | 840 | 222 |
| Span: (D90-D10)/D50 | 0.83 | 2.00 | 0.82 | 2.76 | 0.68 |
| % wt > 250 µm | 1.9 | 38.8 | 0 | 43.4 | 2.0 |
| % wt > 355 µm | 1.2 | 23.6 | 0 | 30.4 | 0.7 |
| Bulk density (kg/m³) | 420 | 430 | 390 | 380 | 406 |

TABLE 3

| Example | Extruder rate (kg/h) | Screw speed (rpm) | Specific energy (kWh/kg) | Gels (m⁻²) | White spots quotation |
|---|---|---|---|---|---|
| 1 | 30 | 265 | 0.349 | 88 | 3.2 |
| | 30 | 300 | 0.369 | 69 | 3.3 |
| | 30 | 333 | 0.391 | 129 | 3 |
| | 65 | 333 | 0.270 | 75 | 5.4 |
| | 50 | 265 | 0.284 | 46 | 5.3 |
| | 50 | 300 | 0.300 | 49 | 4.3 |
| | 50 | 333 | 0.317 | 46 | 4.6 |
| | 60 | 265 | 0.255 | 131 | 4.8 |
| | 60 | 300 | 0.272 | 59 | 5.3 |
| | 60 | 333 | 0.287 | 97 | 4.8 |
| 2 (comp) | 30 | 333 | 0.397 | 476 | 4.2 |
| | 30 | 300 | 0.370 | 614 | 4.5 |
| | 30 | 265 | 0.356 | 681 | 3.8 |
| | 70 | 333 | 0.266 | 2236 | 8.8 |
| | 50 | 265 | 0.275 | 1441 | 6.3 |
| | 50 | 300 | 0.288 | 823 | 7.4 |
| | 50 | 333 | 0.311 | 778 | 5.4 |
| | 60 | 265 | 0.254 | 1627 | 9.1 |
| | 60 | 300 | 0.267 | 1638 | 7.3 |
| | 60 | 333 | 0.284 | 1107 | 7.8 |
| 5 | 30 | 333 | 0.430 | 30 | 3.1 |
| | 30 | 300 | 0.401 | 26 | 2.8 |
| | 30 | 265 | 0.376 | 47 | 3.3 |
| | 50 | 333 | 0.321 | 90 | 3.8 |
| | 50 | 300 | 0.307 | 125 | 3.8 |
| | 50 | 265 | 0.289 | 40 | 3.1 |
| | 55 | 333 | 0.306 | 35 | 4.2 |
| | 55 | 300 | 0.292 | 85 | 4.3 |
| | 55 | 265 | 0.273 | 90 | 3.9 |
| | 60 | 333 | 0.295 | 80 | 4.3 |
| | 60 | 300 | 0.279 | 80 | 4.6 |

TABLE 4

| EXAMPLE | Screw speed (rpm) | Residence time (s) | White spots quotation |
|---|---|---|---|
| 3 | 50 | 120 | 5.9 |
| | 100 | 60 | 5.1 |
| 4 (comparative) | 50 | 120 | 7.6 |
| | 100 | 60 | 7.7 |

The invention claimed is:

1. Process for making a film or a pipe, comprising:
compounding an uncompounded polyolefin powder having a particle size distribution such that D95 is less than 355 µm and (D90−D10)/D50 is less than 1.2, where D95, D90, D50 and D10 are defined such that 95 wt %, 90 wt %, 50 wt % or 10 wt % of polymer particles have a diameter of less than D95, D90, D50 and D10 respectively, to form pellets; and then
forming the pellets into a film or a pipe,
wherein the compounding to form pellets utilises a specific energy of no more than 0.40 kWh/kg, and additionally or alternatively the residence time in a pelletisation extruder is no more than 45 seconds, and
wherein the uncompounded polyolefin powder is a multimodal ethylene polymer having a density greater than 940 kg/m³ and a melt flow index $MI_5$ of 0.05 to 50 g/10 min, said multimodal ethylene polymer comprising from 30 to 70 wt %, based on the total weight of the multimodal ethylene polymer, of a first polyethylene fraction having a density of at least 950 kg/m³ and a melt flow index $MI_2$ of at least 10 g/10 min, and from 70 to 30 wt %, based on the total weight of the multimodal ethylene polymer, of a second polyethylene fraction comprising units of ethylene and optionally up to 5 mol % of at least one other alpha-olefin containing from 3 to 12 carbon atoms, and having a melt flow index $MI_2$ of less than 10 g/10 min.

2. Process according to claim 1, wherein the uncompounded polyolefin powder is polyethylene or polypropylene.

3. Process according to claim 1, wherein the uncompounded polyolefin powder has a D95 of less than 300 μm.

4. Process according to claim 3, wherein the uncompounded polyolefin powder has a D95 of less than 250 μm.

5. Process according to claim 3, wherein the uncompounded polyolefin powder has a D95 of less than 210 μm.

6. Process according to claim 1, wherein the uncompounded polyolefin powder has a span (D90–D10)/D50 of less than 1.0.

7. Process according to claim 6, wherein the uncompounded polyolefin powder has a span (D90–D10)/D50 of less than 0.9.

8. Process according to claim 1, wherein the uncompounded polyolefin powder has a D5 of at least 50 μm, wherein D5 is the value under which 5% by weight of the particles are collected.

9. Process according to claim 8, wherein the uncompounded polyolefin powder has a D5 of at least 60 μm.

10. Process according to claim 1, wherein the uncompounded polymer powder has a bulk density (according to ASTM D-1895, method A) of greater than 350 kg/m$^3$.

11. Process according to claim 10, wherein the uncompounded polymer powder has a bulk density (according to ASTM D-1895, method A) of greater than 380 kg/m$^3$.

12. Process according to claim 10, wherein the uncompounded polymer powder has a bulk density (according to ASTM D-1895, method A) between 400 and 460 kg/m$^3$.

13. Process according to claim 1, wherein the film when blown to 200 μm thickness has a gel count, expressed as the number of gels larger than 200 μm per square meter of film, of less than 500.

14. Process according to claim 13, wherein the film when blown to 200 μm thickness has a gel count, expressed as the number of gels larger than 200 μm per square meter of film, of less than 200.

15. Process according to claim 13, wherein the film when blown to 200 μm thickness has a gel count, expressed as the number of gels larger than 200 μm per square meter of film, of less than 100.

16. Process according to claim 1, wherein the uncompounded polymer powder is made in a polymerisation reactor, and then ground after exiting the reactor.

17. Process according to claim 1, wherein the uncompounded polyolefin powder is made by introducing ethylene, a polymerisation catalyst and optionally an alpha-olefin containing from 3 to 12 carbon atoms into a first reactor, polymerising the ethylene in said first reactor to form a first polymer, then transferring a mixture comprising said first polymer and the catalyst to where further polymerisation takes place, optionally in the presence of a further alpha-olefin containing from 3 to 12 carbon atoms, to form a second ethylene polymer, wherein the weight ratio of the two polymers is (30 to 70):(70 to 30).

18. Process according to claim 17, wherein the first polymer is a low molecular weight polymer and the second polymer is a high molecular weight polymer (as determined by GPC), or the first polymer is a high molecular weight polymer and the second polymer is a low molecular weight polymer (as determined by GPC).

19. Process according to claim 1, wherein the uncompounded polyethylene powder is made by performing a polymerisation reaction using a catalyst system comprising:
(a) a catalytic solid which comprises magnesium, at least one transition metal selected from the group consisting of titanium and zirconium, and a halogen, prepared by successively:
reacting, in a first step (1), at least one magnesium compound (M) chosen from oxygen-containing organic magnesium compounds with at least one compound (T) selected from the group consisting of oxygen-containing organic tetravalent titanium and zirconium compounds, until a liquid complex is obtained;
treating, in a second step (2) at a temperature of from 25 to 40° C., the complex obtained in step (1) with a halogen-containing aluminic compound of formula $AlR_nX_{3-n}$, in which R is a hydrocarbon radical comprising up to 20 carbon atoms, X is a halogen and n is less than 3, and
(b) an organometallic compound of a metal chosen from lithium, magnesium, zinc, aluminium or tin.

20. Process according to claim 1, wherein the uncompounded polyolefin powder is made by performing a polymerisation reaction using a catalyst system which has a productivity of at least 5000 g polyolefin/g of catalyst.

21. Process according to claim 20, wherein the uncompounded polyethylene powder is made by performing a polymerisation reaction using a catalyst system which has a productivity of at least 10000 g polyolefin/g of catalyst.

22. Process according to claim 1, wherein the compounding to form pellets utilises a specific energy of no more than 0.30 kWh/kg.

23. Process according to claim 1, wherein the compounding to form pellets utilises a specific energy of no more than 0.25 kWh/kg.

24. Process according to claim 1, wherein the residence time in the pelletisation extruder is no more than 30 seconds.

25. Process according to claim 1, wherein the residence time in the pelletisation extruder is no more than 20 seconds.

26. Process for making a film or a pipe, comprising:
compounding an uncompounded polyolefin powder having a particle size distribution such that D95 is less than 355 μm and (D90–D10)/D50 is less than 1.2, where D95, D90, D50 and D10 are defined such that 95 wt %, 90 wt %, 50 wt % or 10 wt % of polymer particles have a diameter of less than D95, D90, D50 and D10 respectively, to form pellets; and then
forming the pellets into a film or a pipe,
wherein the compounding to form pellets utilises a specific energy of no more than 0.40 kWh/kg, and additionally or alternatively the residence time in a pelletisation extruder is no more than 45 seconds, and
wherein the uncompounded polyolefin powder is a multimodal ethylene polymer having a density between 900 and 930 kg/m$^3$ and a melt flow index $MI_2$ of 0.1 to 20 g/10 min, said multimodal ethylene polymer comprising:
from 30 to 70 wt %, based on the total weight of the multimodal ethylene polymer, of a first polyethylene fraction having a density of less than 950 kg/m$^3$ and a melt flow index $MI_2$ of at least 10 g/10 min, and
from 70 to 30 wt %, based on the total weight of the multimodal ethylene polymer, of a second polyethylene fraction comprising units of ethylene, from 0.1 to 20 mol % of an alpha-olefin containing from 3 to 12 carbon atoms, and having a melt flow index $MI_2$ of less than 10 g/10 min.

27. Process according to claim 26, wherein the uncompounded polyolefin powder is polyethylene or polypropylene.

28. Process according to claim 26, wherein the uncompounded polyolefin powder has a D95 of less than 300 µm.

29. Process according to claim 28, wherein the uncompounded polyolefin powder has a D95 of less than 250 µm.

30. Process according to claim 28, wherein the uncompounded polyolefin powder has a D95 of less than 210 µm.

31. Process according to claim 26, wherein the uncompounded polyolefin powder has a span (D90–D10)/D50 of less than 1.0.

32. Process according to claim 31, wherein the uncompounded polyolefin powder has a span (D90–D10)/D50 of less than 0.9.

33. Process according to claim 26, wherein the uncompounded polyolefin powder has a D5 of at least 50 µm, wherein D5 is the value under which 5% by weight of the particles are collected.

34. Process according to claim 33, wherein the uncompounded polyolefin powder has a D5 of at least 60 µm.

35. Process according to claim 26, wherein the uncompounded polymer powder has a bulk density (according to ASTM D-1895, method A) of greater than 350 kg/m$^3$.

36. Process according to claim 35, wherein the uncompounded polymer powder has a bulk density (according to ASTM D-1895, method A) of greater than 380 kg/m$^3$.

37. Process according to claim 35, wherein the uncompounded polymer powder has a bulk density (according to ASTM D-1895, method A) between 400 and 460 kg/m$^3$.

38. Process according to claim 26, wherein the film when blown to 200 µm thickness has a gel count, expressed as the number of gels larger than 200 µm per square meter of film, of less than 500.

39. Process according to claim 38, wherein the film when blown to 200 µm thickness has a gel count, expressed as the number of gels larger than 200 µm per square meter of film, of less than 200.

40. Process according to claim 38, wherein the film when blown to 200 µm thickness has a gel count, expressed as the number of gels larger than 200 µm per square meter of film, of less than 100.

41. Process according to claim 26, wherein the uncompounded polymer powder is made in a polymerization reactor, and then ground after exiting the reactor.

42. Process according to claim 26, wherein the uncompounded polyolefin powder is made by introducing ethylene, a polymerisation catalyst and optionally an alpha-olefin containing from 3 to 12 carbon atoms into a first reactor, polymerising the ethylene in said first reactor to form a first polymer, then transferring a mixture comprising said first polymer and the catalyst to where further polymerisation takes place, optionally in the presence of a further alpha-olefin containing from 3 to 12 carbon atoms, to form a second ethylene polymer, wherein the weight ratio of the two polymers is (30 to 70):(70 to 30).

43. Process according to claim 42, wherein the first polymer is a low molecular weight polymer and the second polymer is a high molecular weight polymer (as determined by GPC), or the first polymer is a high molecular weight polymer and the second polymer is a low molecular weight polymer (as determined by GPC).

44. Process according to claim 26, wherein the uncompounded polyethylene powder is made by performing a polymerisation reaction using a catalyst system comprising:
(a) a catalytic solid which comprises magnesium, at least one transition metal selected from the group consisting of titanium and zirconium, and a halogen, prepared by successively:
reacting, in a first step (1), at least one magnesium compound (M) chosen from oxygen-containing organic magnesium compounds with at least one compound (T) selected from the group consisting of oxygen-containing organic tetravalent titanium and zirconium compounds, until a liquid complex is obtained;
treating, in a second step (2) at a temperature of from 25 to 40° C., the complex obtained in step (1) with a halogen-containing aluminic compound of formula $AlR_nX_{3-n}$, in which R is a hydrocarbon radical comprising up to 20 carbon atoms, X is a halogen and n is less than 3, and
(b) an organometallic compound of a metal chosen from lithium, magnesium, zinc, aluminium or tin.

45. Process according to claim 26, wherein the uncompounded polyolefin powder is made by performing a polymerisation reaction using a catalyst system which has a productivity of at least 5000 g polyolefin/g of catalyst.

46. Process according to claim 45, wherein the uncompounded polyethylene powder is made by performing a polymerisation reaction using a catalyst system which has a productivity of at least 10000 g polyolefin/g of catalyst.

47. Process according to claim 26, wherein the compounding to form pellets utilises a specific energy of no more than 0.30 kWh/kg.

48. Process according to claim 26, wherein the compounding to form pellets utilises a specific energy of no more than 0.25 kWh/kg.

49. Process according to claim 26, wherein the residence time in the pelletisation extruder is no more than 30 seconds.

50. Process according to claim 26, wherein the residence time in the pelletisation extruder is no more than 20 seconds.

* * * * *